United States Patent [19]

Parra

[11] Patent Number: 4,796,040
[45] Date of Patent: Jan. 3, 1989

[54] BOUNDARY SETTING DEVICE

[76] Inventor: Jorge M. Parra, 615 North Blvd., New Port Richey, Fla. 34652

[21] Appl. No.: 64,418

[22] Filed: Jun. 22, 1987

[51] Int. Cl.⁴ .............................................. G03B 13/02
[52] U.S. Cl. ........................................ 354/219; 356/3; 356/247
[58] Field of Search .................. 354/219; 33/228, 233, 33/241, 276, DIG. 21; 356/3, 8, 247, 248

[56] References Cited

U.S. PATENT DOCUMENTS

| | | | |
|---|---|---|---|
| 3,682,552 | 8/1972 | Hartman | 356/3 |
| 4,200,380 | 4/1980 | Sato et al. | 354/219 |
| 4,244,651 | 1/1981 | Roof | 356/247 X |

OTHER PUBLICATIONS

Scientific American, Sep. 1979, vol. 241, pp. 150-162, "Brain Mechanisms of Visions," Hubel et al.
Scientific American, Jun. 1982, pp. 124-134, "Brain Mechanisms of Visual Attention," Wurty et al.
Visual Pattern Recognition, Dodwell, Holt, Rinehart & Winston, 1970, Chapter 7, pp. 120-135.
The Development of Visual Perception, Rosinski, Goodyear Publishing Co., 1977, pp. 31-36.

*Primary Examiner*—Michael L. Gellner
*Attorney, Agent, or Firm*—Jim Zegeer

[57] ABSTRACT

Boundary setting device for binocular visioned observers, including a low powered light source having a predetermined configuration for defining the boundary of a zone of a scene. A sighting tube defines a viewing axis for the light source, including an optical void around said light source means. When the low powered light source means is viewed through one eye of said observer and a scene containing a section to be encompassed within said boundary is viewed by the other eye of said observer, an optically fused image is presented to the observer with said light source means having a predetermined configuration bounding said section to be encompassed in said scene.

2 Claims, 5 Drawing Sheets

U.S. Patent  Jan. 3, 1989  Sheet 1 of 3  4,796,040
FIG.1
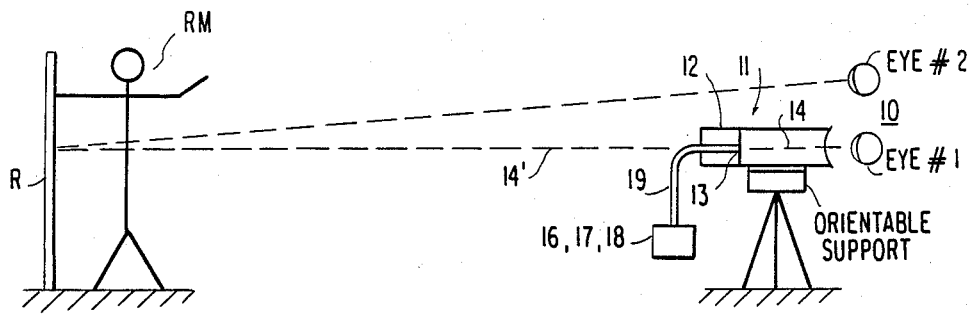
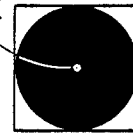
FIG.2  EYE #1 SCENE (EYE #2 CLOSED)
FIG.3  EYE #2 SCENE (EYE #1 CLOSED)
FIG.4  OPTICALLY FUSED SCENE (BOTH EYES OPEN)
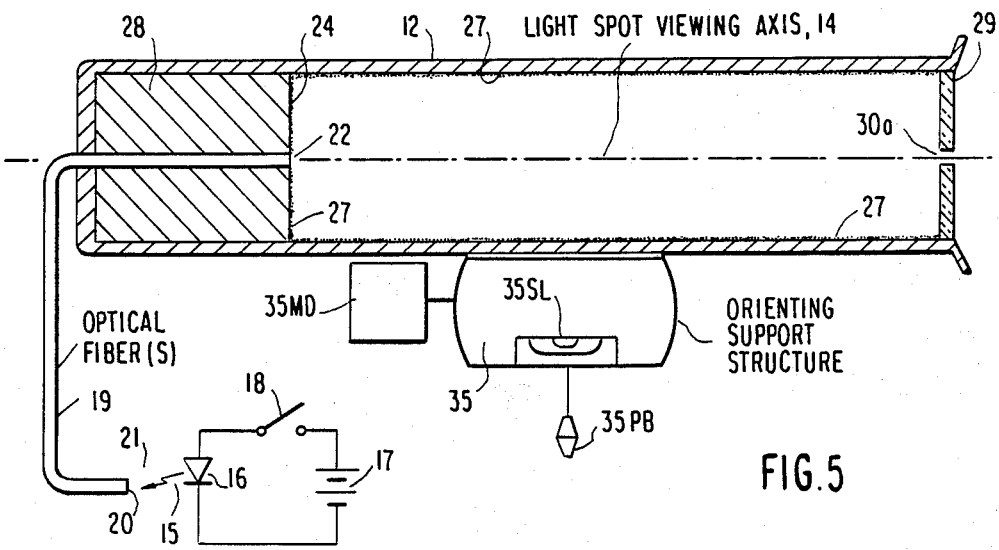
FIG.5

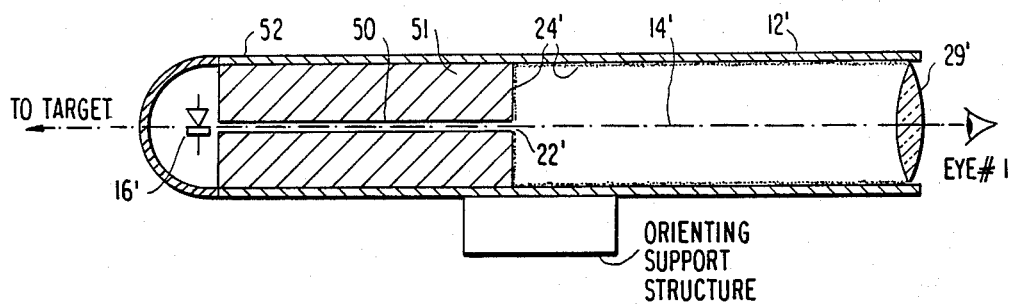
FIG. 6
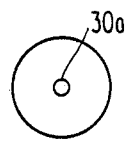 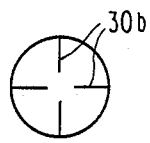 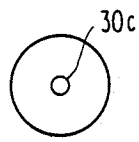 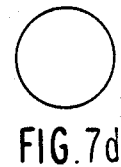
FIG.7a  FIG.7b  FIG.7c  FIG.7d
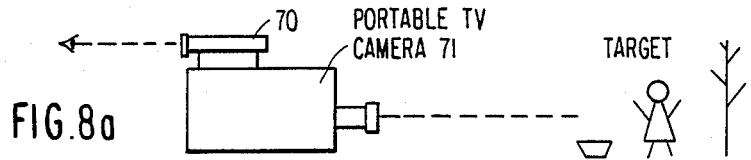
FIG.8a
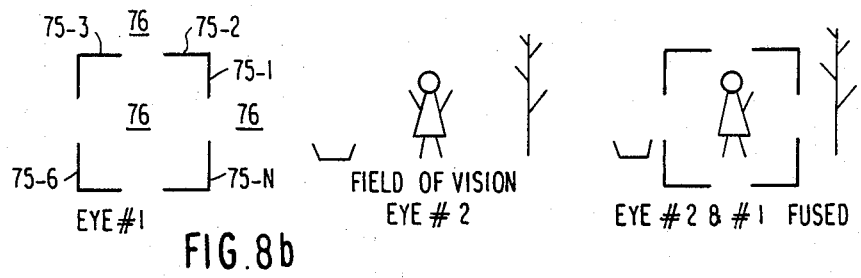
FIG.8b
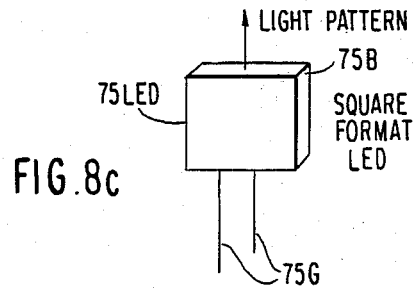
FIG.8c

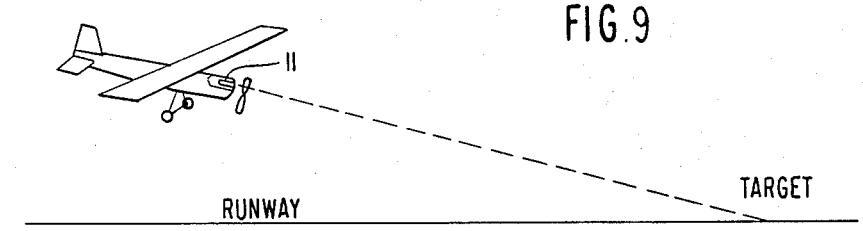
FIG. 9
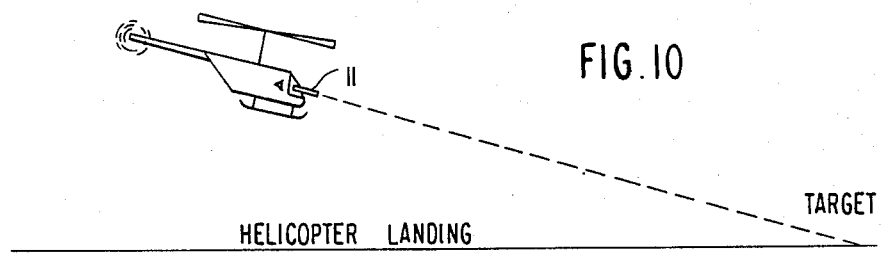
FIG. 10
FIG. 11
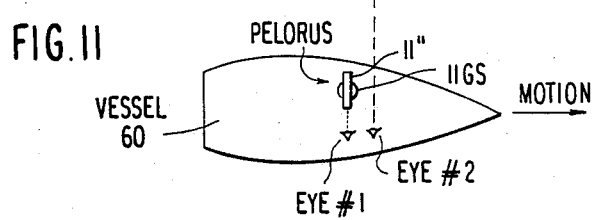
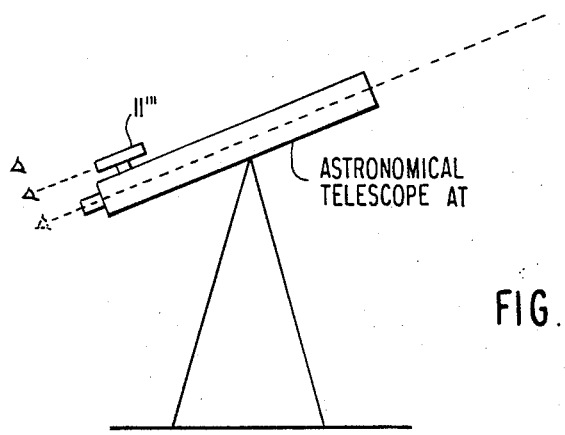
FIG. 12

BOUNDARY SETTING DEVICE

BACKGROUND AND BRIEF DESCRIPTION OF THE INVENTION

The present invention relates to optical instruments for binocular visioned people which is useful for various applications such as surveying, sighting and orienting.

Laser light sources have been increasingly used in surveying and various optical sighting and orienting systems. These typically involve a high power laser projecting light upon a distant target and require certain protective measures to avoid damage to the human eye. Moreover, the laser beam expands in diameter with distance. When used for gun sighting, the laser beam provides a path to the sighting device. In other sighting applications various forms of lighted reticles are used such as in optical instruments where the illuminated reticle is superposed on the image of a scene, such as a target in which the illuminated reticle is viewed. In such systems, one eye is closed and the scene with the superposed reticle superposed thereon is viewed through the one open eye. In other systems such as in photogrammatic stereoplotters, periscopes, etc., a light spot reticle is optically added to a stereo scene, either directly or indirectly through half-silvered mirrors, prisms, etc.

The present invention depends on the phenomena of the human brain which fuses images viewed by one eye with images viewed by the other eye to superpose a collimated light spot reticle upon the image of a scene viewed through the other eye. In a preferred embodiment, a low powered light point source of visible radiation having a wavelength in the range of 200-900 NM (nanometer) and 660NM has been found to be very useful, collimated and surrounded by an optical void (as defined herein, an optical void is a black or non-visible background immediately surrounding the point light source) which substantially excludes from vision in one eye all objects except the collimated light point source of visible monochromatic radiation. In this context, it is not required that the observer's eye be positioned directly on the instrument to exclude the remainder of the scene from the normal field of vision of the eye that is viewing the point light source. The optical void can be created by locating the collimated light point source of visible monochromatic radiation of wavelength in a tubular body member which is internally coated with radiation absorbent material such as a black paint or an otherwise non-reflective coating. In some cases, there can be a halo effect created by an incomplete optical void which can help to locate the point light source for the observer. In a preferred embodiment, the point light source is circular and about 1 mm in diameter.

When a scene is observed using the one eye (with or without magnification) and the other eye of an individual is viewing the collimated light point source of visible monochromatic radiation, due to the optical fusion property of the human brain, the point light source appears centrally in the fused scene.

The term "low power" is meant a light source which does not require protective measures for the eye. The combination of high power sources with some form of energy attenuation effected prior to forming the point light source is also encompassed by this term. Typical PN junction diodes or optoelectronic light source useful in the practice of this invention operate in the under 100 milliwatt range.

When the collimated light point source is mounted on an orientable support structure, such as surveyor's transit tripod and leveling structure, and plumbed and leveled in the same fashion as plumbing and leveling a surveyor's transit, and the collimated light point source is viewed through one eye and the other eye views the scene, the collimated light point source which has been leveled is fused into the scene viewed, by the other eye. A stadia rod, for example, will have the light spot positioned at a precise target point and the normal measurements are made. This results in a higher degree of measurement accuracy than the best available optical level, and at longer ranges. When mounted on a rifle, for example, and the collimated light source has its axis oriented with the axis of the rifle barrel, and the target viewed with one eye, wherever the light spot appears in the fused scene, the axis of the rifle barrel is oriented precisely with the position of the light spot at the target. The system of this invention is impervious to working conditions (condensation, rising thermal waves) and variable light conditions. It has lower instrument costs, minimal power and weight requirements, and is simpler to use and has a range limited only by line of vision. There is no difference in whether the observer has corrective lenses (glasses, contact lenses, tinted, etc.) or not.

In the preferred embodiment, a 660NM wavelength produces optimal visual fusion of the two images. The optical void or black surround enhances the visual fusion of the two images. In addition, the red band has less permanency on the human retina. Moreover, in many surveying, aircraft landing systems, etc., the background is predominantly green or another background color on which the "red bond" light stands out more prominently. While the 660NM wavelength point light source has been found to be most preferable, it is to be understood the broader aspects of the invention encompass other wavelengths.

In other sighting situations, when the device is mounted on an orientable support surface, such as a light on a particular landing spot (in the scene viewed by the other eye) and by maintaining the spot of light on that point through maneuvering of the helicopter aircraft, effect a proper and safe landing.

Thus, the present invention provides an improved optical sighting instrument which requires the use of two eyes and the optical fusion property of the human brain but, in comparison with the best optical level, for example, results in:
  (1) greater accuracy,
  (2) impervious to:
     (a) condensation,
     (b) rising thermal waves,
     (c) full functions under various light conditions,
  (3) minimal power requirements,
  (4) range limited only by line of sight,
  (5) simpler to use,
  (6) minimal adjustments previous to use.

The orientable support referred to above can be a surveyor's instrument base, such as a transit, level, etc., aircraft (fixed and rotary wing), weapon (rifles, pistols, rocket launchers, cannons, etc.), pelorus (also known as an astrolobe or ship's transit and used for maritime navigation) telescopes (used for spotting purposes for large astronomical telescopes, both optical and radio), television cameras and the like. This listing is not intended to be exclusive, but, rather, is exemplary of the wide fields of uses of this invention.

BRIEF DESCRIPTION OF THE DRAWINGS

The above and other objects, advantages and features of the invention will become clearer when considered with the following specification and accompanying drawings wherein:

FIG. 1 is a diagrammatic illustration of a surveying scene using a level transit incorporating the invention, FIG. 2 is the scene viewed by eye No. 1 of FIG. 1, FIG. 3 is the scene viewed by eye No. 2 viewing in the sighting instrument incorporating the invention, FIG. 4 is the scene view by eye No. 1, and eye No. 2 as optically fused by the brain, FIG. 5 is a partial sectional and schematic view of an instrument incorporating the invention, FIG. 6 is a partial sectional view of a further preferred embodiment of the invention, FIGS. 7a, b, c and d are front elevational views of alignment devices to maintain axial accuracy of sighting along the axis of the light source and sighting tube, FIGS. 8a is an illustration of the application of the invention to boundary set or sight and frame a scene for a camera, such as a portable TV camera, FIG. 8b illustrates the eye No. 1 and No. 2 views and the optically fused view, FIG. 8c illustrates one of the eight LED's used to form the high source in a predetermined configuration, FIG. 9 is an illustration of the use of the invention to assist the pilot of an aircraft to land when there is no cross wind and situation of fog, haze, light rain, in which only one end of the runway is visible, FIG. 10 is an illustration of the invention used to assist the pilot of a helicopter to land, FIG. 11 is an illustration of the invention used with a pelorus in navigation, and FIG. 12 illustrates the use of the invention as a spotting device for an astronomical telescope.

DETAILED DESCRIPTION OF THE INVENTION

Referring now to FIG. 1, which depicts a scene in surveying, a rod man RM is shown holding a stadia rod R. The eyes 10 of the surveyor or engineer are designated as eye No. 1 and eye No. 2, it being appreciated that eye No. 1 can be the left or right eye of the observer and the same with eye No. 2. An optical instrument 11, incorporating the invention has a sighting tube 12 and a source of collimated light 13 positioned along the viewing axis 14 at one end of sighting tube 12. Several embodiments of the sighting tube and its component parts are disclosed in FIGS. 5, 6 and 7. In the embodiment shown in FIG. 5, instrument 11 includes a source of monochromatic light 15 constituted by a lower power source of monochromatic radiation, such as PN junction diode 16 which is energized by battery 17 through switch 18. A fiber optic wave guide or optical wire 19 has one end 20 adapted to receive light energy 21 from junction diode 16 and convey same to end 22 (which preferably is squared or normal to the optical or light spot viewing axis 14) which is located along the light spot viewing axis 14 of instrument 11. In a preferred embodiment, the area 24 immediately surrounding the end 22 of the fiber optic element 19 is formed as an optical void and, preferably, is coated with a light absorbent substance such as a flat or matte black coating material 27. In a preferred embodiment, the end 22 of fiber optic wave guide 19 has a diameter of about one (1) millimeter. Fiber optic wave guide 19 serves as a collimator for the light rays emitted by PN junction diode 16. In a preferred embodiment, the length of the fiber optic element is between about 1 and about 5 meters. An eye piece 29 which may be a lens, constitutes an eye alignment device which assists the surveyor observer in aligning eye No. 1 with the predetermined viewing axis 14. The alignment device shown in FIG. 7(a) is a centrally located perforation 30(a) which is coaxial with viewing axis 14 and of approximately the same diameter as the light spot at end 22 of fiber optic wave guide 19. In FIG. 7, the alignment indicia are silk-screened cross-hair or fiducial markings 30b, with the central portions omitted to permit the light spot to be observed more clearly. In FIG. 7c, a circle 30(c) is engraved with the center aligned with the predetermined viewing axis 14 of the light spot at the end 22 of the fiber optic wave guide 19. Finally, in FIG. 7d, the element is constituted by a plain glass plate and the whole diameter of the element is used for alignment. The alignment device of FIG. 7d is particularly for use with the aircraft landing embodiments shown in FIGS. 9 and 10 where the pilot's eye No. 1 will be spaced further from the end and the measurement precision of surveying is not required.

As shown in FIG. 5, the orienting support structure 35, may be the leveling and plumbing portions of a surveyor's level, transit or theodolite, etc., which has a plumb bob 35PB and spirit, level or bubble level 35SL and supported by a tripod or other ground engaging structure. The measurement devices diagrammatically illustrated at 35MD are the usual angle reading instruments and may be mechanical or electronic with a microprocessor and liquid crystal, or other electronic displays.

In the modified embodiment shown in FIG. 6, the point light source is formed by a light emitting diode 16' at one end of a light collimating passage 50 in light collimator 51 mounted in the end 52 of tube 12'. The axis of collimating passage 50 is coaxial with the light spot viewing axis VA. The interior surfaces of tube 12' and collimator 51 are coated with a light absorbent material 24' to create an optical void about the viewing axis VA. In this case, where no fiber optics are used, for optimal performance, and greater accuracy, the length of collimating tube or passage 50 should be the same as or greater in length then balance of tube 12'. Again, an alignment assisting device 29 (FIGS. 7a, 7b, 7c or 7d) may be used to assure alignment of the observer's eye No. 1.

Referring now to FIG. 9, the instrument 11 is mounted on an adjustable mount and used for guiding the pilot to a landing spot target. By angularly adjusting the instrument 11 on its mounting to the crab angle required for any cross-wind, the pilot will be assisted in maintaining the glide path to the target spot at the end of the landing field. In FIG. 10, the instrument 11 is mounted on a helicopter to assist guiding the helicopter pilot to a landing spot.

It can also be used to assist in aiming guns, rockets and like armaments on the aircraft or on the ground.

The instrument of this invention can also be used in navigation. As shown in FIG. 11, the instrument 11" is mounted on a gyroscopic stabilizer 11GS on a vessel 60 for making measurements relative to target T located along a shore or coastline and on an astronomical telescope AT in place of the usual spoting telescope.

In each of these embodiments, the collimated light spot is positioned (by moving the tube) on any selected target in the field of vision of eye No. 2 to thereby precisely orient the viewing axis VA with the selected target.

For measuring and some orienting purposes, the collimated point light source with a predetermined viewing axis is required. However, for boundary setting purposes, such as framing in a view finger for a camera (film or video) or for spotting purposes, such as in landing an aircraft, a collimated light spot and accuracy of measurement is not needed or required, the invention provides a visual framing system. Referring to FIGS. 8a, 8b and 8c, instead of a collimated point light source, a plurality of light sources 75-1, 75-2 . . . 75-N of predetermined shape and preferably in a common plane are arrayed in a desired framing pattern (square, but circular, rectangular or other geometrical boundary shape may be used) and surrounded by an optical void 76 in tube 70 and mounted on a portable TV camera 71.

When eye No. 1 of the observer views the array of light sources and optical void 76 (FIG. 8 left) and eye No. 2 views the full scene (FIG. 8b, middle) an optically fused scene (FIG. 8c, right) a fused image is presented to the observer with the array of light elements 75-1, 75-2...75-N framing a setting the boundary of the image to be captured on tape or film. The individual light sources may be light emitting diodes 75LED shown in FIG. 8c, in which a bar of light 75B is emitted when the leads 75G are energized.

While the invention has been shown and described in relation to the preferred embodiments, it will be appreciated the various modifications and adaptations of the invention will be readily apparent to those skilled in the art and it is intended to encompass such modifications and adaptations within the spirit and scope of the claims appended hereto.

What is claimed is:

1. Boundary setting device for binocular visioned observers, comprising, in combination, a low powered light source means having a predetermined configuration for defining the boundary of a zone of a scene, sighting tube means defining a viewing axis for said light source means, including means forming an optical void around said light source means, whereby when said low powered light source means is viewed through one eye of said observer and a scene containing a section to be encompassed within said boundary is viewed by the other eye of said observer, an optically fused image is presented to the observer with said light source means having a predetermined configuration bounding said section to be encompassed in said scene.

2. A camera scene framing device comprising, a boundary setting device for a binocular visioned person, including:

a low powered light source means having a predetermined configuration for defining the boundary of a zone of a scene to be framed, and means to energize said light source, sighting tube means defining a viewing axis for said light source means, including means forming an optical void around said light source means, whereby when said low powered light source means is viewed through one eye of said person and a scene containing a section to be framed within said boundary is viewed by the other eye of said person, an optically fused image is presented to the person with said light source bounding said section to be framed on said scene.

* * * * *